United States Patent
Som

(10) Patent No.: US 9,387,590 B2
(45) Date of Patent: Jul. 12, 2016

(54) METHOD FOR OPERATING AN INDUSTRIAL ROBOT

(71) Applicant: REIS GROUP HOLDING GMBH & CO. KG, Obernburg (DE)

(72) Inventor: Franz Som, Lutzelbach (DE)

(73) Assignee: REIS GROUP HOLDING GMBH & CO. KG, Obernburg (DE)

( * ) Notice: Subject to any disclaimer, the term of this patent is extended or adjusted under 35 U.S.C. 154(b) by 0 days.

(21) Appl. No.: 14/389,822

(22) PCT Filed: Apr. 5, 2013

(86) PCT No.: PCT/EP2013/057197
§ 371 (c)(1),
(2) Date: Oct. 1, 2014

(87) PCT Pub. No.: WO2013/150136
PCT Pub. Date: Oct. 10, 2013

(65) Prior Publication Data
US 2015/0057804 A1    Feb. 26, 2015

(30) Foreign Application Priority Data
Apr. 5, 2012  (DE) .................. 10 2012 103 032

(51) Int. Cl.
*G05B 15/00* (2006.01)
*G05B 19/00* (2006.01)
(Continued)

(52) U.S. Cl.
CPC .............. *B25J 13/06* (2013.01); *G05B 19/409* (2013.01); *G06F 3/04883* (2013.01)

(58) Field of Classification Search
CPC ..... B25J 13/06; G06F 3/04883; G05B 19/409

USPC .......................... 700/245, 253, 257, 262, 264
See application file for complete search history.

(56) References Cited

U.S. PATENT DOCUMENTS

| 5,617,515 A | 4/1997 | MacLaren et al. |
| 5,937,143 A * | 8/1999 | Watanabe ............. B25J 9/1671 700/264 |

(Continued)

FOREIGN PATENT DOCUMENTS

| AT | WO 2011153570 A1 * | 12/2011 | ............. B25J 9/1656 |
| DE | 60309409 T2 | 3/2007 | |

(Continued)

OTHER PUBLICATIONS

International Search Report dated Jul. 2, 2013, corresponding to International Patent Application PCT/EP2013/057197.

(Continued)

*Primary Examiner* — Jaime Figueroa
(74) *Attorney, Agent, or Firm* — Ladas & Parry LLP

(57) ABSTRACT

A method for operating an industrial robot by means of an operating device, including a step of touching a virtual operating element of a touch display of a graphical user interface. A function associated with the operating element is triggered when the virtual operating element is touched, the movement of the industrial robot being carried out relative to a robot coordinate system and the movement on the touch display being carried out relative to a display coordinate system. In order to be able to simply align the coordinate systems of the operating device and of the industrial robot with each other, the display coordinate system is recalibrated after a relative movement of the operating device with respect to the robot coordinate system.

10 Claims, 8 Drawing Sheets

Figure 1:
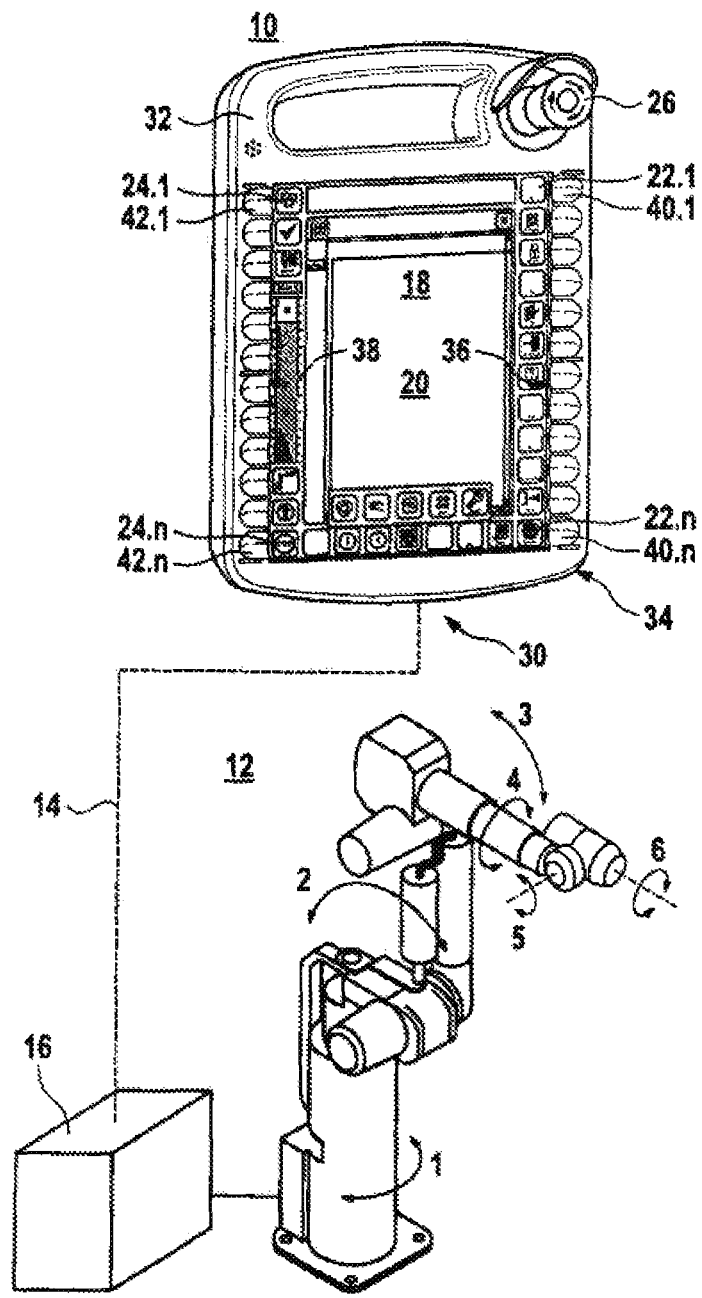

(51) Int. Cl.
*B25J 13/06* (2006.01)
*G05B 19/409* (2006.01)
*G06F 3/0488* (2013.01)

(56) References Cited

U.S. PATENT DOCUMENTS

| | | | | |
|---|---|---|---|---|
| 6,088,628 | A * | 7/2000 | Watanabe | B25J 9/1656 |
| | | | | 700/251 |
| 7,346,478 | B2 * | 3/2008 | Walacavage | G05B 19/056 |
| | | | | 700/105 |
| 2005/0080515 | A1 * | 4/2005 | Watanabe | B25J 9/1671 |
| | | | | 700/264 |
| 2006/0229766 | A1 | 10/2006 | Setsuda | |
| 2006/0241812 | A1 | 10/2006 | Jung | |
| 2009/0109195 | A1 * | 4/2009 | Kent | G06F 3/045 |
| | | | | 345/178 |
| 2009/0289591 | A1 * | 11/2009 | Kassow | B25J 9/1671 |
| | | | | 318/568.13 |
| 2010/0152899 | A1 * | 6/2010 | Chang | B25J 9/162 |
| | | | | 700/262 |
| 2010/0174410 | A1 * | 7/2010 | Greer | A61B 19/2203 |
| | | | | 700/264 |
| 2013/0116828 | A1 * | 5/2013 | Krause | B25J 9/1605 |
| | | | | 700/264 |
| 2013/0207920 | A1 * | 8/2013 | McCann | G06F 3/0488 |
| | | | | 345/173 |

FOREIGN PATENT DOCUMENTS

| | | |
|---|---|---|
| DE | 102007029398 A1 | 1/2009 |
| DE | 102010007455 A1 | 8/2011 |
| DE | 102010025781 A1 | 1/2012 |
| DE | 102010039540 A1 | 2/2012 |
| EP | 1795315 A1 | 6/2007 |
| JP | EP 0792726 A1 * 9/1997 ............ B25J 9/1671 |
| WO | 2008128626 A3 | 10/2008 |

OTHER PUBLICATIONS

German Office Action dated Nov. 20, 2012, corresponding to German Patent Application 102012103032.4.

M. J. Micire: "Multi-Touch Interaction for Robot Command and Control", Dec. 2010.

* cited by examiner

METHOD FOR OPERATING AN INDUSTRIAL ROBOT

This application is a 371 of PCT/EP2013/057197, filed on Apr. 5, 2013, which claims priority to German Application No. 102012103032.4, filed Apr. 5, 2012.

Immediately following the Claims, insert the Abstract of the Disclosure that appears on the following page.

The invention relates to a method for operating an industrial robot by means of an operating device, comprising the method step of touching a virtual operating element of a touch display of a graphic user interface, wherein a function associated with the operating element is triggered when the virtual operating element is touched, and wherein the movement of the industrial robot is carried out relative to a robot coordinate system and the movement on the touch display is carried out relative to a display coordinate system.

A device for controlling an industrial robot in the form of a manual control device is described in DE 10 2010 039 540 A1. The manual control device may be coupled to a robot control in order to program or control the industrial robot.

The manual control device comprises electronics, which include a microprocessor in order to be able to communicate with the robot control. The manual control device also includes a display in touch screen design, an emergency off-switch and a change-over switch designed as a lock. In order to manually move, for example, a robot arm, the manual control device includes various input devices and traversing means manually activatable independently of one another, which are designed, for example, as a 6D mouse or touch keys. With the aid of the touch screen, it is possible to associate each of the traversing means with its own reference coordinate system.

In the known embodiment, however, the industrial robot is controlled exclusively via the manually activatable input devices, such that the manual control device is costly to manufacture and is vulnerable during operation.

Another device for operating an industrial robot is described in DE 10 2010 025 781 A1. The hand-held device in the form of a mobile telephone has a touch screen, which functions on the one hand as an output device for outputting information from the robot control, in particular, for displaying a user interface and, on the other hand, as a command input device for inputting control commands by means of keys.

The hand-held device is detachably connected to a portable safety apparatus by means of a clamp device as is known, in principle, for example, for mobile telephones in motor vehicles, and is connected to the safety unit via an USB interface. The safety input apparatus includes an emergency stop button, a confirm button and an operating mode selector switch. The disadvantage of this embodiment is that to safely operate the virtual keys, the operating person is forced to look at the touch screen in order to avoid input errors. The same applies under adverse environmental conditions, such as strong incidence of light or darkness, which would make it difficult to operate the touch screen.

De 10 2010 039 540 A1 shows a manual control device for manually moving a robot. The manual control device has mechanical input means and traversing means, which are associated with reference coordinate systems for moving a robot arm.

The subject matter of DE 10 2010 007 455 A1 is a system and a method for contactless detection and recognition of gestures in a three-dimensional space.

The reference Ph.D. thesis of Mark John Micire: "Multi-Touch Interaction for Robot Command and Control", December 2010, shows a method for controlling a robot with the aid of a touch screen. The movements of the robot may be controlled by moving a finger on the touch screen.

A hand-held device for controlling a robot is shown in U.S. Pat. No. 5,617,515 A. The positioning of the hand-held device relative to a coordinate system is ascertained with the aid of a computational device in order to control the robot.

A method and a device for programming an industrial robot is described in DE 10 2007 029 398 A1. In this method, a manual programming device is oriented in the space corresponding to a desired orientation, which a coordinate system to be defined is intended to assume.

A hand-held device for activating a robot is known from EP 1 795 315 A1. In this case, the coordinate system of the hand-held device relative to that of the robot is detected in order to undertake a transformation relative to the coordinate systems.

The object of the present invention is to further refine a method of the aforementioned kind in order to increase safety when operating an industrial robot.

To achieve the object, the invention essentially provides that following a relative movement of the operating device relative to the robot coordinate system, the display coordinate system is recalibrated by a directed movement of a finger of an operating person on the touch display, that the recalibration is activated by actuating a virtual operating element, that the directed movement of the finger on the touch display in a selected direction of the robot coordinate system is detected, and that a vector direction used for the recalibration between a first contact point and a release point is calculated after the finger is lifted off.

In particular, it is provided that as a result of the directed movement of the finger on the touch display, the selected direction of the robot coordinate system corresponding to a base axis such as x- or y-axis of a Cartesian coordinate system is reproduced.

As a further refinement, the invention provides that the base axis is indicated by a marking on a floor space of the robot.

With the aid of the calculated vector direction, the selected direction of the robot coordinate system and the shared z-vector, a rotation matrix is calculated, via which henceforth all movements of the finger on the touch display are transformed, before they are sent as traversing settings to the robot control.

In particular, the invention is distinguished by a method for operating an industrial robot by means of an operating device, including a method step of touching a virtual operating element of a touch display of a graphic user interface, wherein a function associated with the operating element is triggered when the virtual operating element is touched, and wherein the movement of the industrial robot is carried out relative to a robot coordinate system and the movement on the touch display is carried out relative to a display coordinate system, wherein following a relative movement of the operating device relative to the robot coordinate system, the display coordinate system is recalibrated by a directed movement of a finger of an operating person on the touch display, in that the recalibration is activated by actuating a virtual operating element, in that the directed movement of the finger on the touch display in a selected direction of the robot coordinate system is detected, and a vector direction used for the recalibration between a first contact point and a release points is calculated after the finger is lifted off, and with the aid of the calculated vector direction of the selected direction of the robot coordinate system and a shared z-vector, a rotation matrix is calculated, via which henceforth all movements of the finger on the touch display are transformed, before they are sent as traverse settings to the robot control.

Preferably, the direction of the recalibrated display coordinate system is graphically represented on the touch display, in particular, by an oriented pointer.

According to the invention, manual recalibration takes place without sensors. A short, directed finger movement on the display oriented parallel to a predefined marking in the operating area of the robot is sufficient for recalibration. As a result of the directed finger movement, a vector is calculated on which the recalibration is based.

In particular, the marking extends in the operating area of the robot and preferably coincides with an axis of the robot coordinate system such as an x- or y-axis of the Cartesian coordinate system. This axis may be marked, for example, on the floor space of the robot or may be some other marking such as an arrow in the operating area of the robot. The short, directed finger movement is represented, in particular, as a pointer on the display, or a pointer is oriented to the directed finger movement in order to allow for visual comparison with the marking.

The recalibration may particularly preferably also be used for any other freely definable coordinate systems, such as frames.

It should be noted that the touch screen in this case is preferably a standard touch screen having a flat surface, which is preferably designed as a capacitive touch screen, although a resistive touch screen is also possible.

According to another preferred embodiment of the method, it is provided that the touch of the virtual operating element is detected on the surface of the touch display by ascertaining a first coordinate of a contact point, and that a function of the virtual operating element is triggered when the first coordinate of the contact point, after remaining in contact with the surface of the touch display, leaves a predefined coordinate space as a result of a manual action by the operating person.

In this case, the manual action may be triggered by gestures of the operating person. The gestures may be carried out by a drawing of the finger of the operating person on the touch display into or out of the predefined coordinate space. Preferably, the gestures are carried out in a defined direction, the sensitivity of the reaction to the finger movement, the intensity of the gestures being continuously adjusted.

In addition, the invention relates to a uniquely inventive method for operating an industrial robot with a hand-held device. In this case, it is provided that the triggering of a touch function requires a manual action by the operator on the touch display. In order to prevent an inadvertent triggering of virtual operating elements by an unintended touch, a function is only triggered if, after touching the touch display, specific "small gestures" are executed, for example, drawing the finger in a defined direction. The result is a "reliable touch".

The gestures required for triggering a function, that is, the required intensity or type of gestures, may be continuously adjusted: They range from a simple touch of the finger, the usual operation of the touch display, to a defined gesture. Haptic markers, such as the specific shape of finger recesses in the display edge, allow the finger in continuation of the finger recesses to glide onto the touch display and trigger a function. If the operator notices that he has inadvertently triggered a function, he is able to suppress triggering of the function by withdrawing the finger into the original position.

The device according to the invention is distinguished over the prior art, in particular, in that the number of hardware components is reduced to an absolute minimum. All operating functions are consistently implemented in touch software, with the exception of the safety-related "emergency-stop" and "confirm" switches. No other electrical components, such as, membrane keys, switches or indicator lights, are required.

The benefit of the savings in space achieved is a large, convenient touch display. The virtual operating elements and displays shown on the touch display are designed for industrial use and are high-contrast and shown in large display, making a reliable operation possible.

Figure 2:
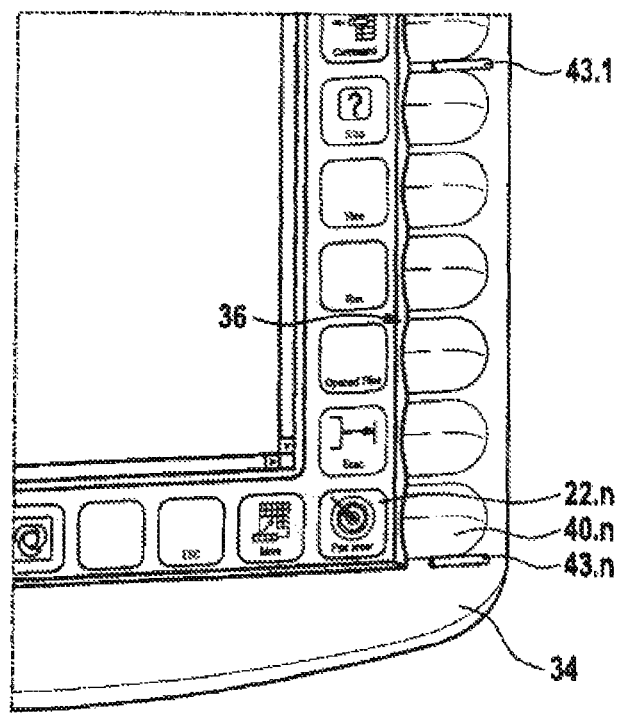
Figure 3:
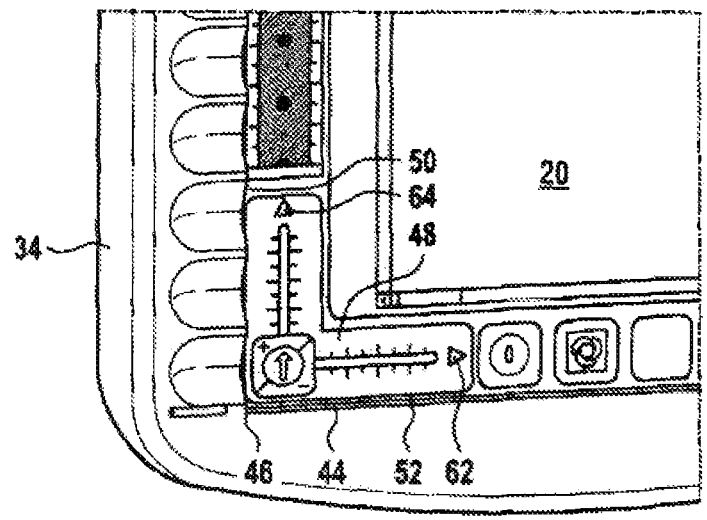
Figure 4:
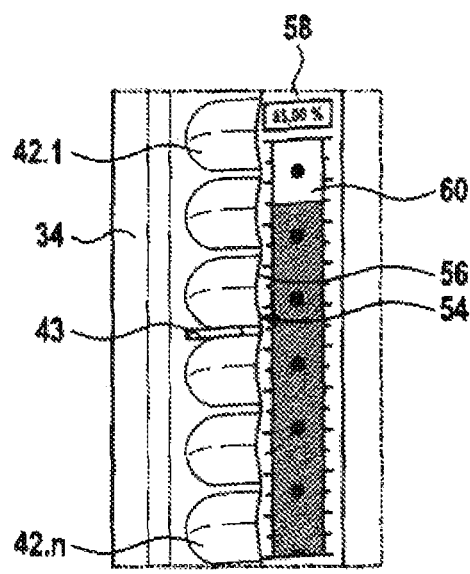
Figure 5:
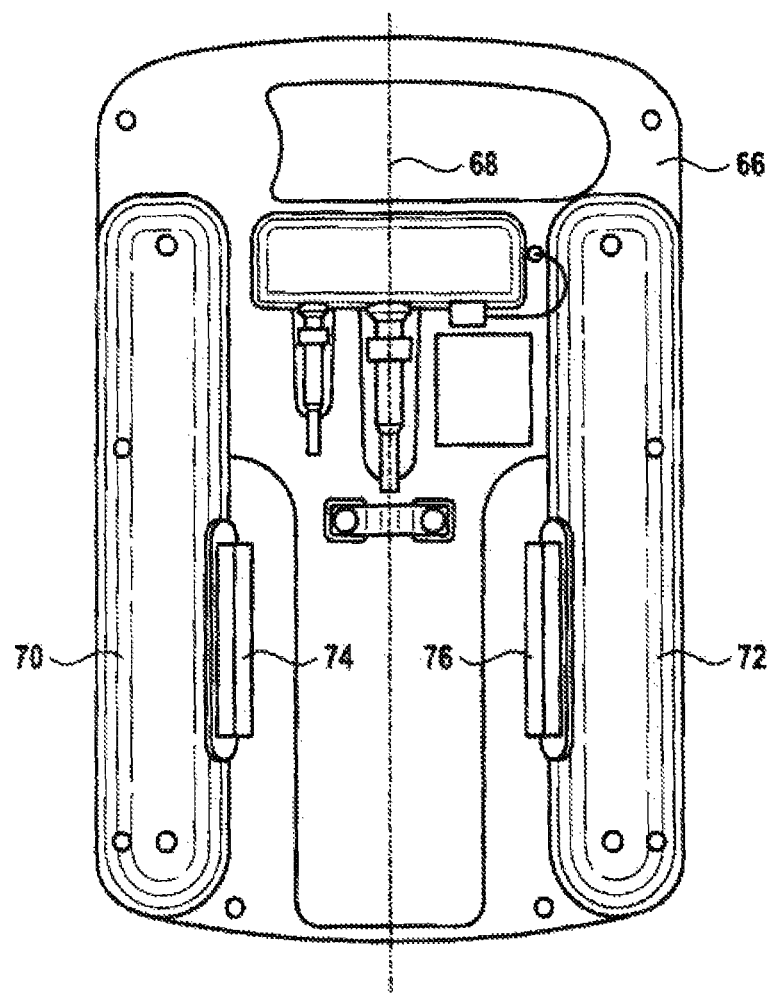
Figure 6:
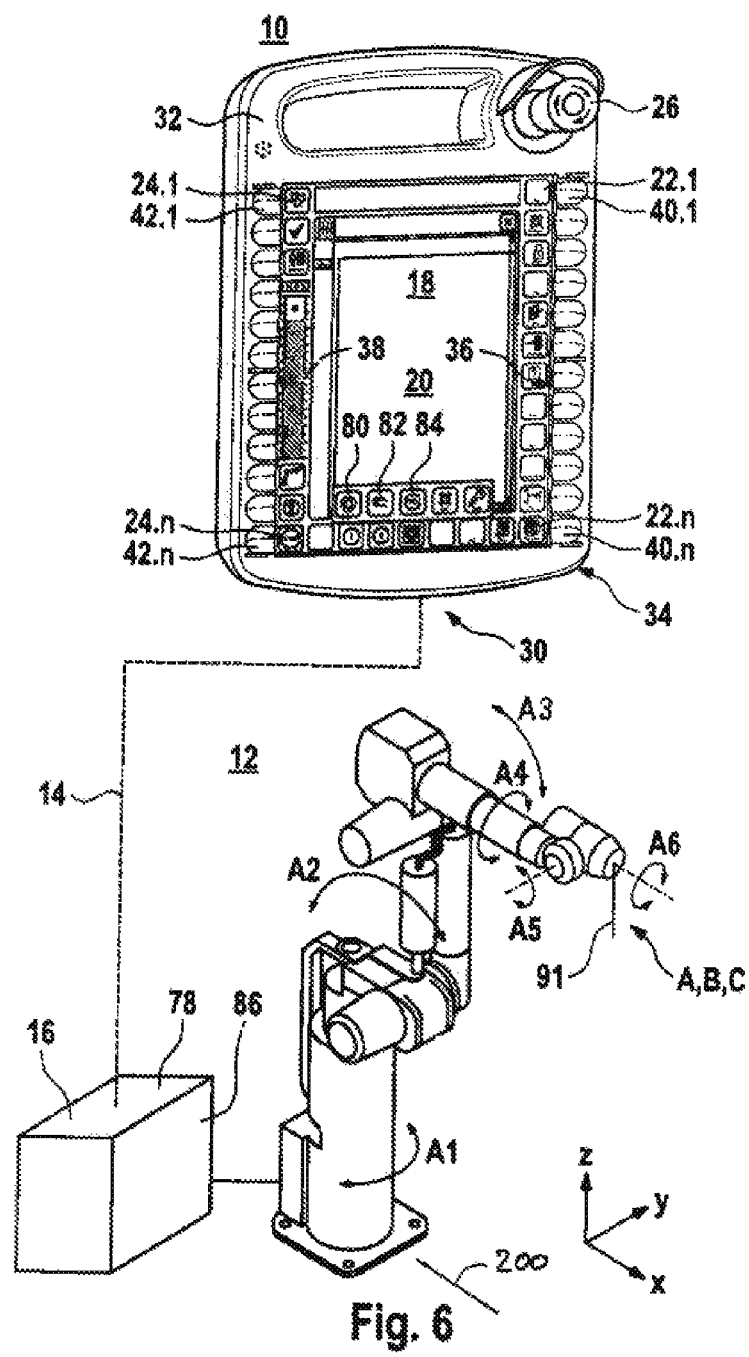
Figure 7:
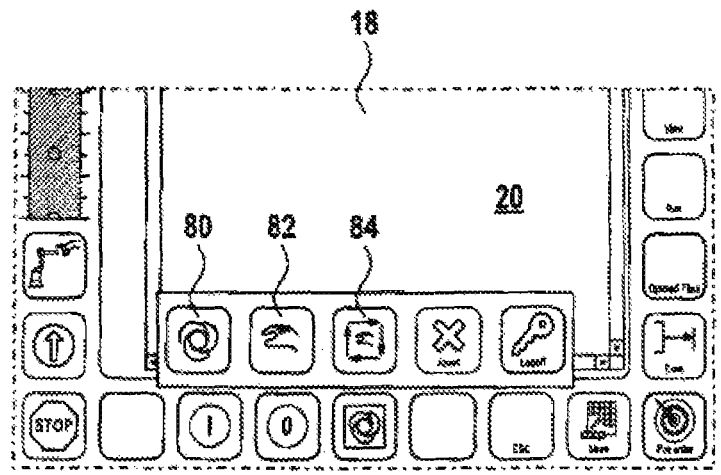
Figure 8:
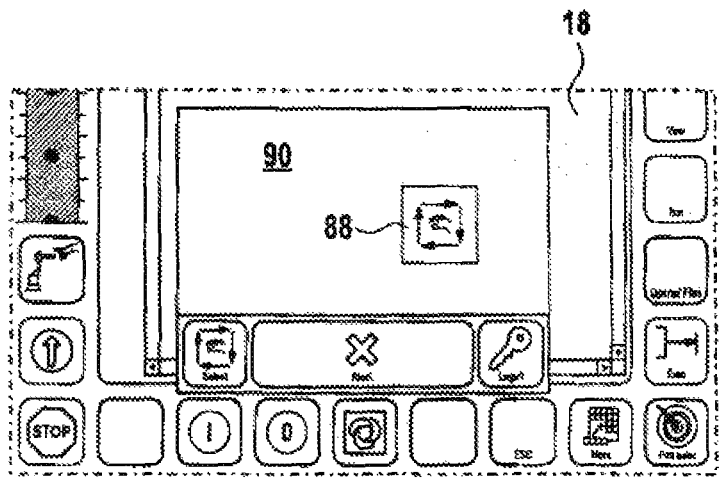
Figure 9:
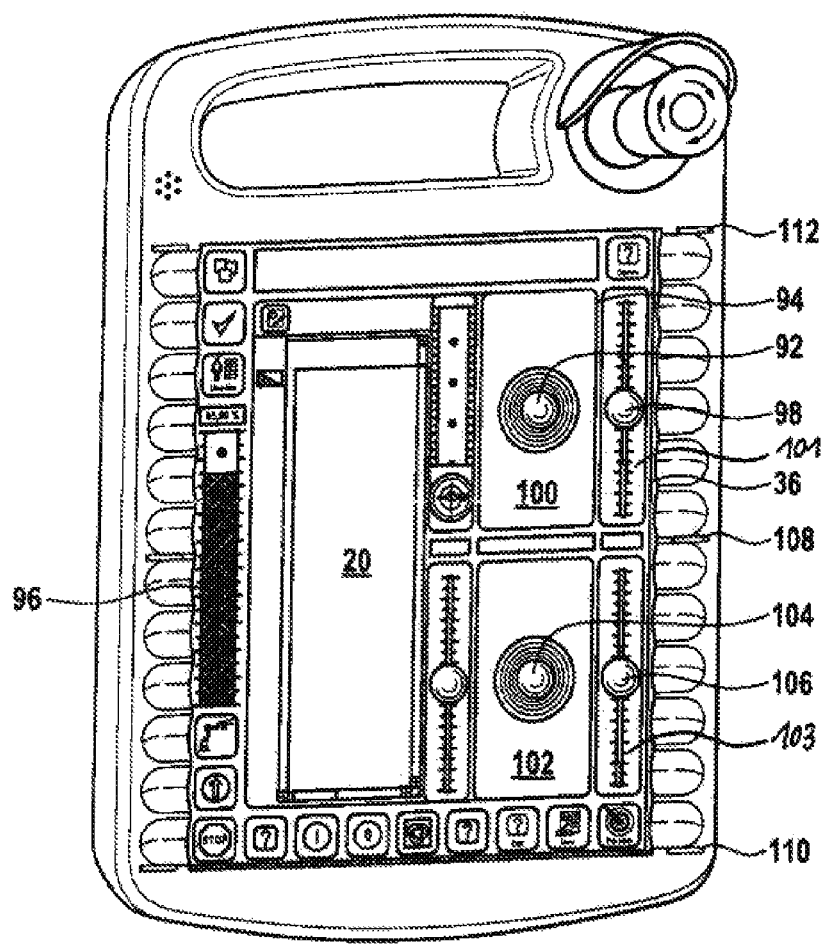
Figure 10:
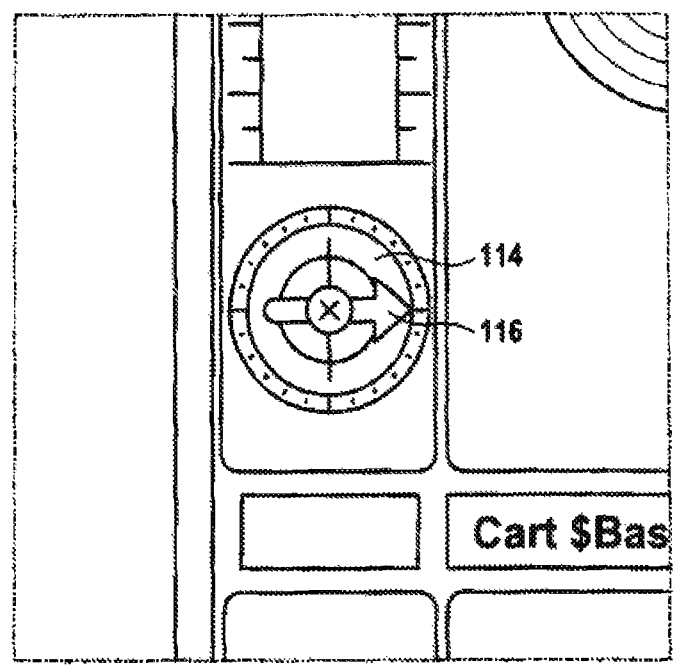

Additional details, advantages and features of the invention are set forth not only in the claims, the features drawn from the claims—per se and/or in combination—but also in the following description of the exemplary embodiments shown in the drawings, in which:

FIG. 1 shows a hand-held programming device for operating an industrial robot,

FIG. 2 shows a section of the display frame of the hand-held programming device bordering the touch display, FIG. 3 shows a second section of a display frame bordering the touch display, and FIG. 4 shows a third section of a display frame bordering the touch display, FIG. 5 shows a rear view of the hand-held programming device, FIG. 6 shows a schematic method for operating an industrial robot with an operating device, FIG. 7 a partial view of a user interface of the operating device including virtual operating elements, FIG. 8 shows a partial view of a user interface of the operating device including an image with graphic information, FIG. 9 shows a user interface of the operating device including various traversing surfaces, and FIG. 10 shows a virtual operating element for recalibrating the coordinate system of the operating device.

FIG. 1 shows a device 10 in the form of a hand-held programming device for operating an industrial robot 12. For this purpose, the hand-held device 10 is connected via a wireless or wired communication link 14 to a robot control 16. The hand-held device 10 comprises a graphic user interface 18 having a touch-sensitive display 20, hereinafter called touch display. The touch display 20 is used to display at least one virtual operating element 22.1 ... 22.n, 24.1 ... 24.n, which represents a function for controlling, programming or operating the industrial robot 12, the associated function being triggered with the touch of the virtual operating element 22.1 ... 22.n, 24.1 ... 24.n with a finger of an operating person or with a stylus.

The hand-held device 10 also includes a control unit 30 for controlling the graphic user interface 18 and for communicating with the robot control 16, as well as a position sensor for determining position and angle of the operating device.

The graphic user interface 18 with the touch display 20 is arranged together with the control unit 30 in a housing 32. The housing 32 forms a display frame 34, which encloses the touch display 20 along the edges. Arranged on an upper side of the housing 32 is, in addition, a safety-related "emergency-stop" switch 26.

The virtual operating elements 22.1 ... 22.n, and 24.1 ... 24.n are arranged along each of the frame sections 36, 28 of the display bordering the touch display 20. To enable a blind operation of the virtual operating elements 22.1 ... 22.n and 24.1 ... 24.n, haptic markers 40.1 ... 40.n and 42.1 ... 42.n, respectively, are arranged in the frame section 36, 38 in accordance with a first independent inventive concept. Each haptic marker 40.1 ... 40.n, 42.1 ... 42.n is associated with a virtual operating element 22.1 ... 22.n, 24.1 ... 24.n.

In this configuration, the virtual operating elements 22.1 ... 22.n, 24.1 ... 24.n, in particular, border directly on the haptic markers 40.1 ... 40.n, and 42.1 ... 42.n, such that a direct transition takes place from the haptic markers 40.1 ... 40.n and 42.1 ... 42.n to the virtual operating element 22.1 ... 22.n, 24.1 ... 24.n. Consequently, in more or less one move, a finger guided along a haptic marker 40.1 ... 40.n, and 42.1 ... 42.n is guided to the virtual operating element 22.1 ... 22.n, 24.1 ... 24.n. In this way, operating errors are avoided or minimized. First, the position of the virtual operating element is felt with the aid of the haptic markers, after which the function is triggered by touching the virtual operating element. Moreover, the touch screen, i.e., the display 20 is not required to have a particular shape. In particular, and contrary to the prior art, it is not necessary to apply special overlaid materials on the display, which would otherwise result in a loss of transparency.

The haptic markers 40.1 ... 40.n and 42.1 ... 42.n form a guide, by which a finger of an operating person is guided to the associated virtual operating element 22.1 ... 22.n, 24.1 ... 24.n.

FIG. 2 shows an enlarged view of the operating elements 22.1 ... 22.n and the haptic markers 40.1 ... 40.n associated with them.

The arrangement of the virtual operating elements 22.1 ... 22.n and 24.1 ... 24.n along the frame sections 36, 38 that include the haptic markers 40.1 ... 40.n, 42.1 ... 42.n, ensures a safe operation of the virtual operating elements. In this arrangement, the off-set and particularly pronounced frame sections 36, 38 serve as a tactile orientation on the touch display 20.

In the exemplary embodiment depicted in FIG. 2, the haptic markers 40.1 ... 40.n, 42.1 ... 42.n are designed as finger recesses, which are molded in such a way that they can be reliably felt with the fingers, and ensure a guiding of the finger from the frame sections 36, 38 in the direction of the associated virtual operating element 22.1 ... 22.n and 24.1 ... 24.n.

Also provided are haptic markers 43.1 ... 43.n, which are designed as nipples and are arranged on a surface of the display frame 34.

In this way, the principally lacking haptic of a touch display 20 is compensated for one, and for another, the operator is able to direct his visual attention to the industrial robot and the process without having to look at the hand-held operating device or hand-held device 10, as a result of which operating safety on the whole is increased. This makes a "blind operation" possible.

FIG. 3 shows an embodiment of a haptic marker 44 in the form of a frame corner 46 of the display frame 34 bordering the touch display 20. The frame corner 46 of the display frame 34 defines a clear, precise position on the touch display 20. Provided for these selected positions is a virtual operating element 48 on the touch display 20 which, for example, is moved in a linear direction along a frame section 50 on the display side or along the other frame section 52 of the frame corner 44.

FIG. 4 shows another embodiment of a haptic marker 54, which is designed on the display side as a frame section 56 of the display frame 34. The finger of an operating person may execute a sliding motion along the frame section 56, over which a virtual sliding element 60 extending along the frame section 56 may be moved.

The haptic markers 40.1 ... 40.n, 42.1 ... 42.n depicted in FIGS. 1 and 2 and designed as finger recesses form a haptic orientation on the display edge with high resolution, for example, for feeling positions of the virtual operating elements 22.1 ... 22.n, 24.1 ... 24.n, since these are situated immediately next to the finger recesses. Each finger recess may be clearly associated with a virtual operating element. The finger recesses 22.1 ... 22.n, 24.1 ... 24.1n are designed as semi-open and opened in the direction of the touch display 20, so that a finger is able to slide as if guided in a groove onto the touch display 20 where it is able to trigger a function of the virtual operating element 22.1 ... 22.n, 24.1 ... 24.n.

According to an independent inventive concept, it is provided that the triggering of a function associated with the virtual operating element 22.1 ... 22.n, 24.1 ... 24.n requires a manual action by the operating person on the touch display 20. In order to avoid an inadvertent triggering of the virtual operating element 22.1 ... 22.n, 24.1 ... 24.n by an unintended touch, a function is only triggered if, after the touch display 20 is touched, predefined gestures such as, for example, a swipe of the finger in a defined direction are carried out. The sensitivity of the response to the movement of the finger may be continuously adjusted by a regulator. In this way, the intensity of the required gestures required to trigger functions may be continually adjusted. These range from a simple touch of the finger, the usual operation of the touch display, 20, to a specific small gesture. The specific shape of the finger recesses 22.1 ... 22.n, 24.1 ... 24.n in the frame section 36, 38 allows the finger in continuation of the finger recesses to glide onto the touch display and in so doing trigger a function. If the operator notices that he has inadvertently triggered an undesired function, he is able to suppress triggering of the function by withdrawing the finger to the original position.

Once the operating person, starting for example from the finger recess 40.n, touches the finger to the virtual operating element 22.n, the corresponding coordinates of the touch point are detected on the touch display by the control unit 30. Based on the definition of preset gestures, the associated function is triggered only when the finger of the operating person leaves a predefined coordinate space or reaches a predefined coordinate space. When the virtual operating element is deflected and is therefore ready to trigger (triggering occurs when the finger is released), this is indicated by a visual identifier on the operating element, for example, by a colored border. If an inadvertent deflection is cancelled by retracting the operating element to its original position, this is marked by a disappearance of this visual identifier.

According to another uniquely inventive embodiment of the invention, virtual operating elements 48, placed for example in the frame corner 46 of the display frame 34, are linked to a special gesture control. These may be moved, for example, along the frame sections 50, 52 in two directions 62, 64, as is depicted in FIG. 3. Each movement direction 62, 64 is associated with a selectable function. Thus, for example, it is possible to activate a function "A" when moving along the frame section 52 and to activate a function "B" when moving along the frame section 50. In the process, the degree of deflection is evaluated, two evaluation options being provided.

According to a first evaluation option, the degree of deflection is immediately passed to the function as an analog parameter, such as speed setting. If the finger in the deflected position is released, the analog value immediately jumps to zero. If the finger is slid back to the starting position 66, the parameter analogous to the deflection is reset to zero. This function may be used, for example, in order to start a movement program in a positive or negative direction while continuously varying the speed in the process.

According to a second evaluation option, it is provided that when exceeding a definable threshold value, a switching function is triggered. The function is activated only if the finger in the deflected position leaves the touch display 20. The triggering of the function is prevented, however, if the finger is guided on the frame sections 50, 52 back to the zero position without releasing.

Another uniquely inventive concept of the invention relates to the implementation of a so-called override function (speed controller), which is implemented via the shift-operating element 60, depicted in FIG. 4. For this purpose, the slide-operating element 60 is placed along the frame section 56 and centered relative to the haptic marker 43. In this way, it is possible to feel the position of the slide-operating element 60 and to adjust it by sliding the finger along the frame section 56. The blind adjustment is additionally aided by the haptic markers 42.1 . . . 42.n, 43, 54 of the frame sections 38, 56. The so-called override can be adjusted by a defined amount, for example, 20%, when shifted between two haptic markers. With the aid of the slide-operating element 60 situated on the edge, it is possible to also adjust other analogous variables, such as process parameters during blind operation.

Another uniquely inventive feature relates to the symmetrical arrangement of the haptic markers 22.1 . . . 22.n, 24.1 . . . 24.n in relation to the longitudinal, respectively, transverse axis of the touch display 20. The longitudinal middle axis in this case is the straight line which runs centrally and parallel to the longitudinal frame sides of the display frame 34. Running perpendicular to this is the transverse middle axis, that is, between and parallel to the shorter transverse sides of the display frame 34. This ensures that the hand-held device 10 is adapted for both a right-handed operation and a left-handed operation. This is achieved, in particular, by the consistent, button-less design of the graphic user interface and by the symmetrical arrangement of the haptic markers. Thus, the graphic user interface may be switched from right-handed operation to left-handed operation via a simple set-up function. In this case, all positions of the virtual operating elements 22.1 . . . 22.n, 24.1 . . . 24.n are mirrored on the longitudinal axis of the touch display 20.

FIG. 5 shows a rear side 66 of the housing 32. Arranged on the rear side 66 and symmetrically to the longitudinal axis 68 are grips 70, 72 with which the hand-held device 10 may be securely held with one or with both hands. The grips 70, 72 may have an outer geometry corresponding to cylindrical segments, wherein the grips 70, 72 are intended to originate from the outer edge, i.e. from the longitudinal edges of the display frame 34. Integrated in each grip 70, 72 is, in each case, a confirm switch or a confirm button 74, 76, one of which must be selectively activated for the traverse release of the industrial robot.

This symmetrical arrangement prevents hand fatigue, since the confirm switch elements 74, 76 may be actuated alternately with the left or the right hand. In the event of hand fatigue, the respective other hand may take over confirming without disruption to the traverse release for the movement of the robot.

Another uniquely inventive embodiment of the invention is distinguished by the fact that a heretofore conventional key switch for selecting the robot operating modes "Configure", "Automatic", "Automatic test", is replaced by a software function. The special feature is found, amongst others, in the data processing using failsafe technology. The touch display 20 is basically a single channel and, therefore, an unsafe device. With the aid of a safety control integrated in the robot controller 16 according to FIG. 6, hereinafter called safety controller 78, a safe functionality of the software is ensured.

The safety controller 78 is described in the European Patent Application 035 953, the disclosure of which is incorporated in its entirety in the present application.

On the touch display 20, the user interface 18 offers a selection of various operating mode options in the form of virtual user interfaces 80, 82, 84 as soft keys, as is depicted in FIG. 7. By touching one of these soft keys 80, 82, 84, the operator selects a new operating mode "X". From the software of the user interface, the newly selected operating mode is sent as a command "request new operating mode X" to the safety controller 78. The safety controller 78 extracts graphic information from its memory 86 corresponding to this operating mode, such as icon 88, and places it at a randomly determined display position in a larger image 90. The position of the icon 88 in the image 90 is known only to the safety controller 78. This image 90 is sent as an image file, such as a bitmap, to the user interface 18 and displayed there in a defined position, as is depicted in FIG. 8.

The operator must confirm the operating mode recognized by the safety controller 78 with the tip of a finger on the depicted icon 88. A contact position on the touch display is detected in the form of touch coordinates and sent back to the safety controller 78. The safety controller compares the contact position with that exclusively of the safety controller, i.e., the random display position of the icon 88 in the image 90 known to the safety controller 78. The comparison takes into account the known position of the image 90 on the touch display 20. If the contact position (within a defined tolerance) is the same as the display position, the initiated switch of operating mode is carried out. Otherwise, the switch of operating mode is rejected and the previous operating mode is maintained.

With this method, a secure operating loop between user and safety controller 78 is formed:

Operator selects an operating mode,

Safety controller 78 displays the recognized operating mode on the operating device 10, Operator confirms the accuracy of the displayed operating mode with the safety controller 78, Safety controller 78 sets the new operating mode.

Alternatively to the aforementioned method, the safety controller 78 may display an iconicized numerical code, which is recognized by the user, and which must be input as a number using a displayed keypad. The contact position of the displayed number of the keypad is sent to the safety controller, which verifies the accuracy of the input.

The icons 80, 82, 84 are stored in the safety controller 78 using failsafe technology.

Optionally, a request to switch operating modes may also come via a hardware key switch.

The insertion/removal of the key in the operating mode selection switch is reproduced by a login/logout procedure suing a PIN.

The option of more or less "dragging" the finger after touching the touch display 20 is utilized according to one uniquely inventive method in order to generate an analogous traverse setting for the industrial robot 12. In this way, it is possible to delicately control the industrial robot 12 according to FIG. 6 in 6 degrees of freedom, for example, X, Y, Z and orientations A, B, C of a tool 91.

With the deflection of the finger by an operating person, it is possible to send a position setting to the industrial robot 12, similar to the cursor control via a touch pad on a notebook. In this case, the industrial robot 12 may be traversed simultaneously in two coordinate directions, for example, X and Y.

In another mode, a speed setting for the industrial robot 12 is generated by a deflection of the finger; the more the finger is deflected, the faster the robot moves.

After touching a selected traverse surface 100 depicted in FIG. 9, the user actuates a virtual operating element 92, which is automatically positioned in the area of the contact point. Subsequently, the virtual operating element 92 may be dragged with the finger even beyond a border 94 over the entire touch display 20, and in this way generate travel settings. Upon release, the industrial robot 12 immediately stops. For a new traverse setting, the desired surface 100 must then once again be struck.

The sensitivity of the response to a finger movement may be continuously adjusted via a virtual operating element 96, such as a slide controller (override), both for the position setting and for the speed setting.

The sensitive surface 100 for the 2D-method is placed near the display edge 36, such that, at a clear distance to the display edge, it may still be easily reached with the finger (for example with the splayed thumb).

To be able to traverse in a third coordinate direction (for example, z-coordinate of the Cartesian coordinate system), a field 101 the width of a finger with a virtual operating element 98 is placed directly along the side on the display edge 36, such that this field 101 may be "felt" with the finger by guiding the finger, in particular, the thumb along the display edge 36. This field generates a one dimensional traverse setting, for example, in the z-direction.

As a result of the specific arrangement, the operator is able to clearly distinguish and to blindly reach the two traverse fields 100, 101: The field 101, directly at the display edge 36, the finger having perceptible contact with the housing edge, activates the traverse setting for the third dimension (z-dimension). The field 100, placed approximately a finger or thumb-widths distance next to the display edge 36, activates the simultaneous traverse setting in two dimensions (x-y dimension).

The industrial robot 12 has 6 degrees of freedom. To adjust the orientation of the tool 91 with the three angles (A, B, C), the same method as described above is used. For this purpose, the display is divided into two zones. Situated in the upper zone, for example, are the traverse fields 100, 101 for the dimensions 1-3 (for example, X, Y, Z). Situated in the lower zone are the traverse fields 102, 103 for the dimensions 4-6, for example, A, B, C. The two traverse fields 100, 101 and 102, 103 may be blindly distinguished via the haptic markers in the form of nipples 108, 110, 112.

By touching the traverse fields 102, 103, a virtual operating element 104, 106 in the traverse fields is activated, which is automatically positioned in the area of the contact point. The virtual operating element 104, 106 may then also be dragged across the entire touch display 20 and, in this way, generate an adjustment of the orientation of the tool 91.

With a multi-touch display 20, it is thus possible to traverse the industrial robot 12 in all 6 degrees of freedom simultaneously. With a single-touch display, it is possible to use the traverse functions sequentially only.

In a method using the touch motion function explained above, the touch display is ideally collinearly aligned relative to the coordinate system of the industrial robot. In this case, the movement of the robot optimally matches the finger movement on the touch display.

If, however, the operator turns the operating device 10 sidewards, then this match no longer exists. The direction of movement of the robot then no longer matches the direction of movement of the finger.

The coordinate system of the touch display in this case must then be recalibrated to the coordinate system of the robot.

According to the invention, a specific virtual operating element 114 with a pointer 116 is provided on the touch display 20. This operating element 114 must first be touched with a finger and the finger must subsequently be dragged in the selected direction of the robot coordinate system, for example, x-direction. To visually aid the operator, the x-direction may be indicated in the operating area of the robot, for example, by a marking on the floor surface. The movement of the finger on the operating element 114 and, therefore, the aligning of the pointer 116 occur parallel to the marking present in the operating area of the robot. Such a marking is indicated, for example, in FIG. 6 by "200". Once the finger is lifted off the touch display 20, the vector direction between the first contact point and the release point is calculated. With the aid of the vector, the selected robot coordinate axis and a shared z-vector, a rotation matrix is calculated, via which henceforth all movements of the finger are transformed, before they are sent as traverse settings to the robot control. Thus, the recalibration is carried out as quickly as possible with one single gesture. After recalibration, both coordinate systems are again adjusted collinearly relative to one another, in effect, arranged in order. For better verification, the direction of the calibrated display coordinate system is depicted graphically on the touch display.

The coordinate system for the robot is delineated in FIG. 6. It can be seen that the marking 200 extends parallel to the x-axis. The y-axis extends in the plane of the floor space of the robot 12. The z-axis extends parallel thereto, about which the robot 12 may be rotated (Arrow A1).

Identified in FIG. 1 and FIG. 6 by the arrows 1, 2, 3, 4, 5, 6 and A1, A2, A3, A4, A5, A6 are the pivotal and rotational movements of the robot 12 and of the arm holding the tool 91. Thus, in the exemplary embodiment, the robot 12 is able to move the tool 91 with 6 degrees of freedom.

This calibration method according to the invention, which operates without sensors, may also be used for any other coordinate systems such as, for example, freely definable frames.

The invention claimed is:

1. A method for operating an industrial robot using an operating device, wherein movement of the industrial robot is carried out relative to a robot coordinate system, the method comprising the steps of:

providing an operating device comprising a processor to communicate with the industrial robot;

said operating device comprising a display coordinate system, a graphic user interface having a touch display, and a plurality of operating elements associated with the touch display;

wherein a function associated with an operating element is triggered in response to the operating element being touched;

moving the operating device relative to the robot coordinate system; and recalibrating the display coordinate system relative to the robot coordinate system by:

touching an operating element on the touch display with an object, to establish a first contact point;

moving the object touching the operating element in a selected direction of the robot coordinate system;

lifting the object from the touch display to establish a release point;

detecting the movement of the object in the selected direction of the robot coordinate system; and calculating a vector direction used for calibration between the first contact point and the release point after the object is lifted from the touch display.

2. The method according to claim 1, wherein the selected direction of the robot coordinate system corresponds to an x-axis or a y-axis of a Cartesian coordinate system.

3. The method according to claim 2, wherein the base axis is indicated by a marking on a floor space on which the industrial robot stands.

4. The method according to claim 1, further comprising:
calculating a rotation matrix from the calculated vector direction and a shared z-vector of the display coordinate system and the robot coordinate system;
using the rotation matrix to transform movements of the object on the touch display; and
sending the transformed movements as traverse settings to a control of the industrial robot.

5. The method according to claim 1, wherein the direction of the calibrated display coordinate system is depicted graphically on the touch display.

6. The method according to claim 5, wherein the direction of the calibrated display coordinate system is depicted graphically on the touch display as an oriented pointer.

7. The method according to claim 1, wherein the recalibration is used for a freely definable coordinate system.

8. The method according to claim 1, wherein the freely definable coordinate system is a frame.

9. The method according to claim 1, wherein the operating element is touched with a stylus.

10. The method according to claim 1, wherein the operating element is touched by a finger of a user.

* * * * *